United States Patent
Krieg-Kowald

(10) Patent No.: US 7,374,804 B2
(45) Date of Patent: *May 20, 2008

(54) METHOD FOR RENDERING SURFACE LAYER OF LIMITED PLAY DISK LIGHTFAST

(75) Inventor: Marianne Krieg-Kowald, Barrington, RI (US)

(73) Assignee: Flexplay Technologies, Inc., Atlanta, GA (US)

( * ) Notice: Subject to any disclaimer, the term of this patent is extended or adjusted under 35 U.S.C. 154(b) by 49 days.

This patent is subject to a terminal disclaimer.

(21) Appl. No.: 11/209,953

(22) Filed: Aug. 23, 2005

(65) Prior Publication Data

US 2006/0002263 A1  Jan. 5, 2006

Related U.S. Application Data

(63) Continuation of application No. 10/016,103, filed on Dec. 10, 2001, now Pat. No. 6,982,109.

(60) Provisional application No. 60/254,610, filed on Dec. 11, 2000.

(51) Int. Cl.
*B32B 3/02* (2006.01)

(52) U.S. Cl. .................. 428/64.1; 428/64.4; 428/64.8; 430/270.14

(58) Field of Classification Search .............. 428/64.4, 428/64.8, 64.1; 430/270.14, 270.12
See application file for complete search history.

(56) References Cited

U.S. PATENT DOCUMENTS

| 5,963,536 | A  | * | 10/1999 | Vasic et al. .............. 369/275.3 |
| 6,589,626 | B2 | * | 7/2003  | Selinfreund et al. ....... 428/64.1 |
| 6,756,103 | B2 | * | 6/2004  | Thompson et al. ........ 428/64.1 |
| 6,790,501 | B2 | * | 9/2004  | van de Grampel et al. 428/64.1 |

* cited by examiner

*Primary Examiner*—Elizabeth Mulvaney
(74) *Attorney, Agent, or Firm*—Morris, Manning & Martin, LLP

(57) ABSTRACT

An optically readable media (10) has an information-encoding layer (16) and at least one color-forming layer (12) that embodies an optical readout-limiting mechanism. In a first embodiment the at least one color-forming layer contains an additive that does not interfere with the optical readability of the media for a duration of a readout period. The additive, upon exposure to a source of optical radiation that is suitable for reversing the color-forming layer from an optical readout inhibiting state to an optical readout enabling state, undergoes a transformation that maintains the color-forming layer in the optical readout inhibiting state. More specifically, exposure to the source causes the color-forming layer to photobleach and the additive to oxidize, where the oxidation of the additive permanently inhibits the optical readability of the media. The additive may be a leuco dye. In one embodiment the color-forming layer is comprised of 3-[2,2-bis(4-diethylaminophenyl)vinyl]-6-dimethylaminophthalide and the additive is comprised of benzoyl leucomethylene blue. In a further embodiment the additive is placed into a protective layer (18) that overlies the color-forming layer.

12 Claims, 2 Drawing Sheets

METHOD FOR RENDERING SURFACE LAYER OF LIMITED PLAY DISK LIGHTFAST

CROSS REFERENCE TO RELATED APPLICATION

This application is a Continuation of co-pending U.S. patent application Ser. No. 10/016,103, entitled "METHOD FOR RENDERING SURFACE LAYER OF LIMITED PLAY DISK LIGHTFAST," filed Dec. 10, 2001, which claims the benefit of U.S. Provisional Patent Application No. 60/254,610, entitled "LIMITING SHELF LIFE FOR LIMITED PLAY OPTICAL INFORMATION STORAGE MEDIA" filed Dec. 11, 2000, the entirety of both which are herein incorporated by reference.

FIELD OF THE INVENTION

This invention relates to optically readable information storage media and, more particularly, to a technique for rendering a reading inhibit layer lightfast.

BACKGROUND OF THE INVENTION

It has become commonplace to distribute software or other information, such as music and films, on optically readable media, such as CDs and DVDs. Successful readout of an optical disk by current disk readers heavily relies on a number of parameters that characterize the readout laser beam on its path from the laser to the reflective data layer of the disk and back to the optical pickup system of the reader. The electromagnetic wave structure of the readout beam is described by intensity, phase, polarization, and wave vectors of the wave components that constitute the readout beam. The wave structure of the beam determines geometrical and propagation parameters of the beam, such as beam size, angle of incidence, and angle of convergence.

In addition to reading the data layer of a disk, the reader performs other functions, which are as critical for playability as the data readout itself. These functions include auto-focusing, auto-tracking and error correction. The first two functions allow the reader device to actively control motion of the laser head and spindle motor in order to maintain the required position of the beam relative to the disk. Therefore, maintaining the integrity of the wave structure of the beam throughout its path inside the disk material is a key not only to the successful detection and decoding of the information carried by the beam, but also for the continuity of the readout process.

It is desirable in many applications to limit the duration of time during which the optical disk can be read. For example, one could rent an optical disk containing a film or a musical composition that, after some period of time, would become unreadable. In this case there would be no need to return the optical disk to place where it was rented.

U.S. Pat. No. 5,815,484 discloses an optical disk having a reflective metallic layer with a plurality of data structures (provided in the form of pits and lands) and a compound that reacts with oxygen that is superimposed over at least some of the data structures for inhibiting reading of the information.

Commonly assigned U.S. Pat. No. 6,011,772 discloses a read inhibit mechanism that may also use a barrier layer. For example, the removal of a barrier layer enhances the action of a reading-inhibit agent to prevent machine reading of information encoding features on the optical disk. The reading-inhibit agent may also be activated by exposure to optical radiation, or by rotation of the disk.

A disadvantage of some chemical moieties used in or proposed for use in a reading inhibit layer is that they exhibit poor lightfastness, which could allow the limited play optical disk to be photobleached and subsequently converted back, possibly permanently, to a readable optical disk.

OBJECTS OF THE INVENTION

It is a first object and advantage of this invention to provide an improved system and method for permanently limiting the readability of a media, such as an optically readable media, examples of which include, but are not limited to, a laser disk, a compact disk (CD), or a digital video disk (DVD).

It is a second object and advantage of this invention to provide an improved system and method to render an optically readable media permanently unreadable, after having been read at least once.

It is a further object and advantage of this invention to provide an optically readable media having a read inhibit layer that is rendered lightfast by the addition of a chemical compound.

It is another object and advantage of this invention to provide an optically readable media having a read inhibit layer that is resistant to being photobleached back to a readable state.

It is one further object and advantage of this invention to provide an optically readable media having a read inhibit layer and a protective layer. The protective layer may also function as a barrier layer, and overlies the read inhibit layer. The protective layer includes an additive that oxidizes and becomes optically absorbing at the readout wavelength(s) in response to a source of light, such as UV light, that would also photobleach the read inhibit layer back to an optically transmissive and, hence, optically readable state.

SUMMARY OF THE INVENTION

The foregoing and other problems are overcome and the objects and the advantages of the invention are realized by methods and systems in accordance with embodiments of this invention.

An optically readable media, such as a CD or a DVD, has an information-encoding layer and at least one color-forming layer that embodies an optical readout-limiting mechanism. In a first embodiment the at least one color-forming layer contains an additive that does not interfere with the optical readability of the media for a duration of a readout period. The additive, upon exposure to a source of optical radiation that is suitable for reversing the color-forming layer from an optical readout inhibiting state to an optical readout enabling state, undergoes a transformation that maintains the color-forming layer in the optical readout inhibiting state. More specifically, exposure to the source causes the color-forming layer to photobleach and the additive to oxidize, where the oxidation of the additive permanently inhibits the optical readability of the media. The additive may be a leuco dye. In one embodiment the color-forming layer includes 3-[2,2-bis(4-diethylaminophenyl)vinyl]-6-dimethylaminophthalide and the additive includes benzoyl leucomethylene blue. In a further embodiment the additive is placed into a protective layer that overlies the color-forming layer.

BRIEF DESCRIPTION OF THE DRAWINGS

The above set forth and other features of the invention are made more apparent in the ensuing Detailed Description of the Invention when read in conjunction with the attached Drawing, wherein.

DETAILED DESCRIPTION OF THE INVENTION

Figure 1:
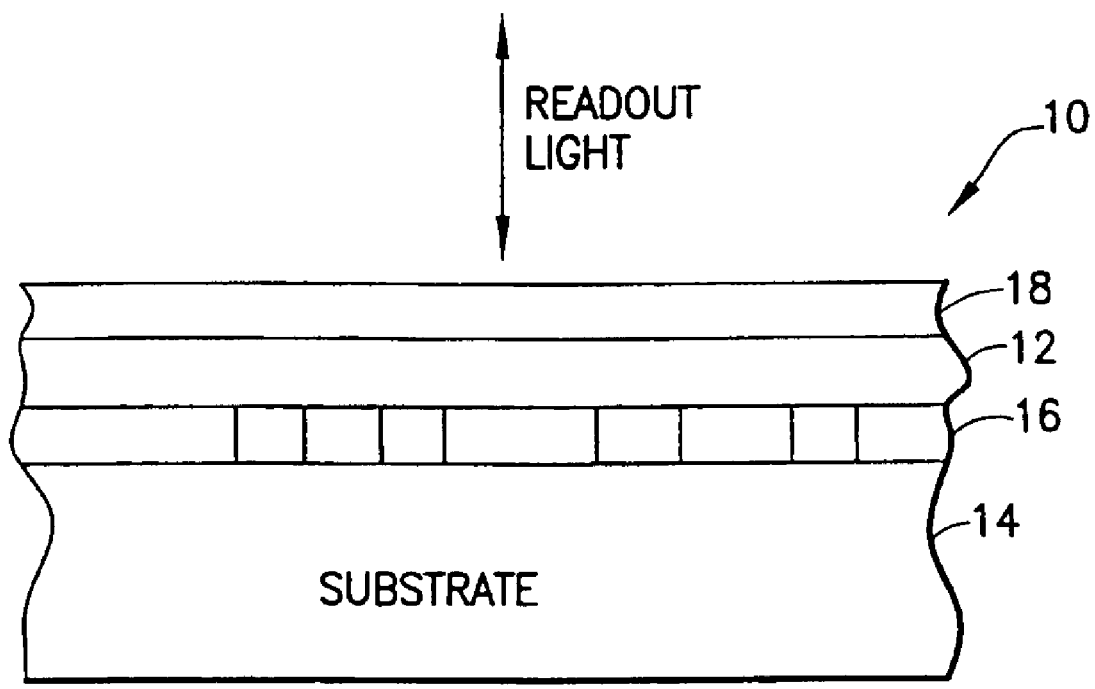
FIG. 1 is a cross-sectional view of an optically readable media that includes a lightfast readout inhibiting layer in accordance with this invention.

FIG. 1 is a cross-sectional view of an optically readable media 10 that includes a lightfast readout inhibiting layer 12 in accordance with this invention. It should be noted at the outset that as employed herein an optically readable media is intended to encompass a number of various devices wherein data (such as a computer program), audio (such as music) and/or video (such as a film or television programming), collectively referred to herein simply as information or content, is stored such that it can be readout when a lightbeam (either visible light or invisible light) is applied to the medium. Such a medium can include, but is not limited to laser disks, compact disks (CDs), CD-ROMs, digital video or versatile disks and certain kinds of tapes.

The media 10 includes a substrate 14, a patterned, reflective surface 16 wherein the information is encoded using conventional techniques, the readout inhibiting layer 12, and optionally a top coat 18 or over coat that can function as a protective layer as well as a barrier layer to at least partially inhibit or slow the evaporation or sublimation of a reactive compound from the readout inhibiting layer 12. Reference in this regard can be made to commonly assigned U.S. patent application Ser. No. 09/690,405, filed on Oct. 17, 2000, as well as to commonly assigned and allowed U.S. patent application Ser. No. 09/338,959, filed on Jun. 24, 1999, both of which are incorporated by reference herein in their entireties.

In general, the media 10 of interest to this invention incorporates the readout inhibiting mechanism or layer 12 that is capable of altering an optical property of the light, for example, the wave front, optical noise content, intensity and/or wave emission wavelength. Also, the reflectance and/or transmission property of the media can be changed.

Limiting or inhibiting the readout of the media 10 can be effected by using a color forming coating. Such a coating functions as the readout-limiting layer 12 by initially permitting, when in a first state, an optically readable media to be read; after which the coating changes to a second state in which the coating prevents the readable of the media 10. The color forming coating changes color, or more precisely transitions from a substantially transparent state (at the readout wavelength(s) of interest) to a substantially absorbing state (again at the readout wavelength(s) of interest), thereby inhibiting readout of the media 10.

By rendering the media "unreadable" it should be understood that it is not necessary to make the entire media 10 unreadable. For example, it may be necessary to make only a relatively small portion of a boot record or a directory of contents unreadable such that the entire media becomes unusable or unreadable, or such that some predetermined portion of the media becomes unusable or unreadable. Making the media unreadable may also imply adversely affecting a readout device optical feedback and tracking process.

Further, it is not necessary for the readout inhibiting layer 12 to become optically opaque, as the media 10 may become unreadable or unplayable well before a state or condition of optical opacity is reached. In general, the readout inhibiting layer 12 can be effective in inhibiting the reading of desired information from the media 10 by causing a failure in any of at least three readout light beam functions: data readout, auto-focusing, and auto-tracking.

Figure 2:
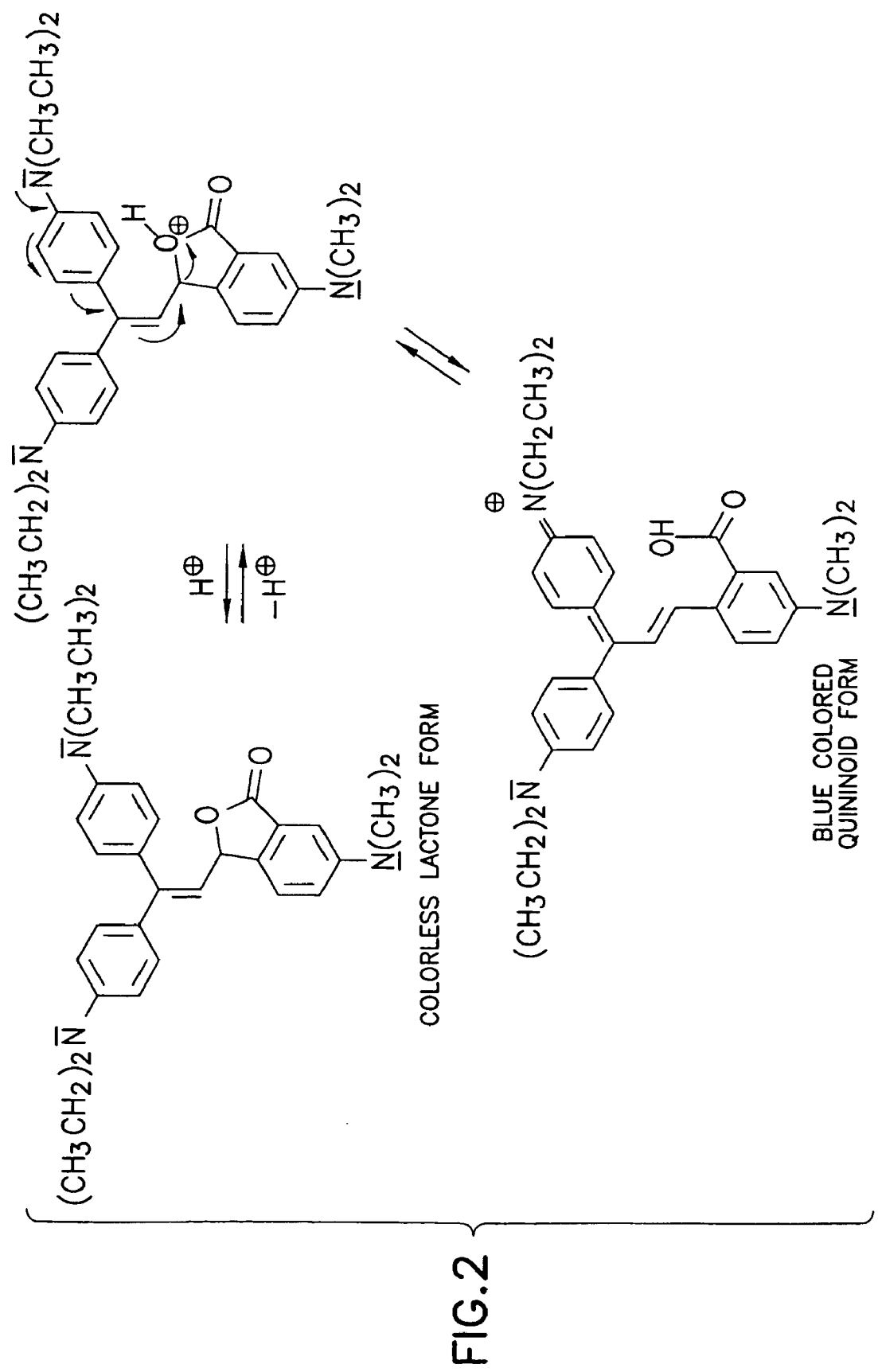
FIG. 2 illustrates an equilibrium mechanism between a colorless lactone form and its cationic colored quininoid form in the optical readout inhibiting layer of FIG. 1.

Referring to FIG. 2, in a presently preferred but not limiting embodiment the readout inhibiting layer 12, which may also be referred to as the color forming coating, includes at least three components: (1) a dye, such as a lactone type dye; (2) acidic sites; and (3) a solvent, such as an amine or amide-based solvent. The acidic sites may be provided by a polymer, a clay, or any other acidic substrate. When the components are combined, the amine or amide-based solvent serves to stabilize the lactone dye to the colorless form. When the amide or amine-based solvent evaporates, the lactone group reacts with the acidic sites and undergoes a ring opening to generate a highly colored substance with a strong absorption at a typical wavelength used to read DVD and CD disks (about 650 nm).

In greater detail, the colorless lactone shown in the reaction scheme shown in FIG. 2 is protonated by an acid. Each nitrogen is shown with its free electron pair. The protonated lactone undergoes a ring opening to produce the colored compound, in this case, a blue quininoid form.

The functioning of this color changing system is based on a four component equilibrium between the colorless lactone form, the colored quininoid form, and the number of acidic and basic sites associated with the permanent and the volatile components of the color changing system.

In various embodiments of this invention, the material that comprises the readout-inhibiting layer 12 can include a lactone dye, such as crystal violet lactone, poly-p-(hydroxystyrene), ethanol, N-methyl pyrrolidinone and ammonia and formaldehyde, or the readout inhibiting layer 12 can comprise cellulose acetate butyrate, ethyl acetate, silica gel, and benzyl alcohol, or the readout inhibiting layer 12 can comprise a salt of a volatile amine, a non-volatile acid component and a lactone dye or a pH indicator dye, or the readout inhibiting layer 12 can comprise a water damp polymer film containing a pH indicator dye, wherein during storage the readout inhibiting layer 12 is exposed to an atmosphere of a gas whose water solution is one of acidic or basic, and wherein upon removal from storage a volatile gas evaporates from the water damp film, and the pH changes causing a color change in the pH indicator dye.

In the preferred embodiments, the readout inhibiting layer 12 contains a dye, such as a lactone dye, having a cation with strong light absorbance properties around 650 nm, a currently preferred wavelength for the readout laser. A polymer material or some other material can be used to provide an acidic environment for causing a controlled ring opening of the lactone dye, and which can be cross-linked or otherwise modified to form a relatively inert or inactive coating layer. Lactone dyes are generally colorless so long as the lactone moiety remains intact. However, by modifying the environment, for example by lowering the pH and/or by changing the micropolarity, the lactone ring is cleaved and the intensely colored cationic form of the dye is obtained.

In general, the rate of color change is dependent on the type of solvent and its boiling point. By selecting an appropriate solvent, complete color formation can occur within a range of a few minutes to several hours to even longer times. Moreover, the final maximum absorbance at the readout wavelength can be modified over a range of absorbances by changing the lactone moiety to acidic site ratio.

In other embodiments of this invention, a polymer may provide a basic environment while the evaporating solvent has an acidic nature. In this case the color change occurs when the system transitions from acidic to basic due to evaporation.

The "undyed" state of the media 10 may be maintained by storing the media 10 in a manner that prevents the solvent from evaporating. For example, the media 10 can be stored in a sealed container, such as a foil or plastic bag, that may contain a source of the volatile component of the readout inhibiting layer 12. In this manner the atmosphere within the container becomes saturated with the volatile component, which in turn inhibits the loss by evaporation (or sublimation in some embodiments) of the volatile component form the readout inhibiting layer 12.

In any of the embodiments, the readout inhibiting layer 12 may be applied by a spin coating procedure. As an example, for the amino-phthalide dye in the 4-vinylphenol polymer embodiment a layer thickness equal to or less than about one micrometer was found to be optimum, and DVD readability was found to be disabled when the absorbance at 650 nm was equal to or greater than about 0.5.

However, if the colored quininoid form of the color forming compound does not have a satisfactory lightfastness, exposing the limited-play system to ultraviolet (UV) light, such as that found in sunlight, may induce a photochemical reaction and hence break down the colored quininoid form into a mixture of colorless chemical compounds. As a consequence, the unreadable media 10 might be made permanently optically readable by exposing the media 10 to UV light, or to direct or indirect (i.e. behind window glass) sunlight.

In accordance with the teachings of this invention, the problem of the media 10 reversal back to readability can be solved by adding an additive either to the color forming coating 12 or to the top polymer protective coating 18. The additive preferably is colorless and remains colorless under regular room light, as well as under normal media readout light wavelengths. However, the additive oxidizes under sunlight or UV light into a colored compound, and the oxidized form has an absorption spectrum that overlaps with the absorption spectrum of the selected colored quininoid form. The additive thus adds a superior lightfastness.

The quininoid photobleaching kinetics, the additive photooxidation kinetics and the optical properties of the quininoid and additive components are preferably matched so that the loss in absorbance of the quininoid form due to photobleaching is corrected by the appearance of the colored photooxidized additive.

The additive can be co-mixed with color former in a polymer formulation that is used when constructing the readout inhibiting layer 12. The lightfastness-enhancing additive need not interact with the performance of the readout inhibiting layer 12 or the protective top polymer coating 18.

The additives may belong to different chemical classes depending on the selected color former(s) of the readout inhibiting layer 12. One such chemical class comprises leuco dyes.

As an example, an appropriate additive for the color former 3-[2,2-bis(4-diethylaminophenyl)vinyl]-6-dimethylaminophthalide is benzoyl leucomethylene blue. Exposure to UV light and sunlight transforms benzoyl leucomethylene blue into methylene blue. Methylene blue is well known for its superior lightfastness, and its absorption spectrum very closely matches the spectrum of the quininoid form of the color former in the readout inhibiting layer 12. This additive can be incorporated into the formulation described as Example 1 below and in the co-pending and commonly assigned U.S. patent application Ser. No. 09/690,405, filed on Oct. 17, 2000, the disclosure of which was incorporated herein in its entirety.

EXAMPLE 1

A solution of 1 g poly(4-vinylphenol) (MW=8,000) in 10 ml ethanol, 2 ml N,N-dimethylformamide and 200 mg of 3-[2,2-bis(4-diethylaminophenyl)vinyl)-6-dimethylaminophthalide was prepared. A surface of an optical disc was coated with this formulation to produce a 500-700 nm thick layer that was substantially uncolored. The coating was dried at 60-70° C. for a few minutes, which caused the generation of an intensely blue colored dye. This blue dye was transformed to a colorless state by exposure to UV light.

The additive, benzoyl leucomethylene blue, is incorporated in the Example 2 formulation as follows:

EXAMPLE 2

A solution was prepared of 1 g poly(4-vinylphenol) (MW=8,000) in 10 ml ethanol, 2 ml N,N-dimethylformamide, 200 mg of 3-[2,2-bis(4-diethylaminophenyl)vinyl]-6-dimethylaminophthalide and 200 mg of benzoyl leucomethylene blue. An optical disc was coated with this formulation to produce a 500-700 nm thick layer that was substantially uncolored. The coating was dried at 60-70° C. for a few minutes, which caused the generation of an intensely blue colored dye corresponding to a limited-play, unreadable state of the disc. However, exposing the coating to sunlight or UV-light did not result in a transformation back to the colorless state, and thus did not defeat the limited-play mechanism.

While described in the context of a single readout wavelength, it is within the scope of these teachings to render lightfast composite and multi-player (multi-wavelength) readout inhibiting layer or layers 12. Such multi-wavelength layer(s) provide absorption maxima at two or more wavelengths that coincide with possible readout light wavelengths, e.g., 630 rim and 780 nm for CDs, 630 nm and 650 nm for DVDs, and may also accommodate future higher density readout wavelengths at shorted wavelengths. The multi-wavelength coating can also be used to absorb a specific wavelength and a range of wavelengths, such as 635 rim and the range of 750 nm to 800 nm.

It can be appreciated that a number of embodiments of the teachings of this invention have been described herein, and it should be further appreciated that the teachings of this invention are not intended to be read in a limiting sense to encompass only these described embodiments.

What is claimed is:

1. A method for using a readout-limited optical media comprising:
   (a) providing the media with at least one layer that embodies a readout-limiting mechanism, said at least one layer comprising an additive that does not interfere with readability of said media for a duration of a readout period; and
   (b) activating said additive upon exposure to a source of optical radiation that is suitable for reversing said layer from an optical readout inhibiting state to an optical readout enabling state such that, when activated, said additive undergoes a transformation that maintains the layer in the optical readout inhibiting state.

2. The method of claim 1, where said additive is comprised of a leuco dye.

3. The method of claim 1, where said layer is comprised of a color former 3-[2,2-bis(4-diethylaminophenyl)vinyl]-6-dimethylaminophthalide and where said additive is comprised of benzoyl leucomethylene blue.

4. The method of claim 1, wherein when in said readout inhibiting state said layer exhibits an optical wavelength absorption range that includes an optical readout wavelength of said media, thereby inhibiting optical readout of said media.

5. The method of claim 4, where exposure to said source of optical radiation causes said additive to oxidize and to exhibit an optical wavelength absorption range that overlaps with said optical wavelength absorption range of said layer, thereby permanently inhibiting the readability of said media.

6. The method of claim 1, where exposure to said source causes said color-forming layer to photobleach and said additive to oxidize, where the oxidation of said additive permanently inhibits the optical readability of said media.

7. An optically readable media comprising an information-encoding layer and at least one color-forming layer that embodies an optical readout-limiting mechanism, said at least one color-forming layer comprising an additive that does not interfere with the optical readability of said media for a duration of a readout period, said additive, upon exposure to a source of optical radiation that is suitable for reversing said color-forming layer from an optical readout inhibiting state to an optical readout enabling state, undergoes a transformation that maintains the color-forming layer in the optical readout inhibiting state.

8. The media of claim 7, where said additive is comprised of a leuco dye.

9. The media of claim 7, where said color-forming layer is comprised of 3-[2,2-bis(4-diethylaminophenyl)vinyl]-6-dimethylaminophthalide and where said additive is comprised of benzoyl leucomethylene blue.

10. The media of claim 7, wherein when in said readout inhibiting state said color-forming layer exhibits an optical wavelength absorption range that includes an optical readout wavelength of said media, thereby inhibiting optical readout of said media.

11. The media of claim 10, where exposure to said source of optical radiation causes said additive to oxidize and to exhibit an optical wavelength absorption range that overlaps with said optical wavelength absorption range of said color-forming layer, thereby permanently inhibiting the readability of said media.

12. The media of claim 10, where exposure to said source causes said color-forming layer to photobleach and said additive to oxidize, where the oxidation of said additive permanently inhibits the optical readability of said media.

* * * * *